US012476568B2

(12) United States Patent
Greetham et al.

(10) Patent No.: US 12,476,568 B2
(45) Date of Patent: Nov. 18, 2025

(54) DRIVE CIRCUIT FOR A BRUSHLESS MOTOR

(71) Applicant: Dyson Technology Limited, Wiltshire (GB)

(72) Inventors: Stephen Greetham, Gloucester (GB); Maté Horvát, Swindon (GB)

(73) Assignee: Dyson Technologies Limited, Wiltshire (GB)

( * ) Notice: Subject to any disclaimer, the term of this patent is extended or adjusted under 35 U.S.C. 154(b) by 68 days.

(21) Appl. No.: 18/038,184

(22) PCT Filed: Nov. 15, 2021

(86) PCT No.: PCT/GB2021/052950
§ 371 (c)(1),
(2) Date: May 22, 2023

(87) PCT Pub. No.: WO2022/117991
PCT Pub. Date: Jun. 9, 2022

(65) Prior Publication Data
US 2023/0421085 A1 Dec. 28, 2023

(30) Foreign Application Priority Data
Dec. 3, 2020 (GB) .................................... 2019089

(51) Int. Cl.
*H02P 6/06* (2006.01)
*H02M 1/08* (2006.01)
(Continued)

(52) U.S. Cl.
CPC .................................. *H02P 27/04* (2013.01)

(58) Field of Classification Search
CPC .. H02P 6/085; H02P 6/06; H02P 27/04; H02P 6/26; H02M 5/2932; H02M 7/5387; H02M 1/0009; H02M 1/08; H02M 5/297
(Continued)

(56) References Cited

U.S. PATENT DOCUMENTS 6,351,397 B1    2/2002  Sawa et al.
2006/0267541 A1 11/2006 Battello et al.
(Continued)

FOREIGN PATENT DOCUMENTS

EP    1154552 A1    11/2001
EP    2309633 A1    4/2011
(Continued)

OTHER PUBLICATIONS

Examination Report received for GB Application No. 2019089.8, mailed on Jun. 22, 2023, 1 page.
(Continued)

*Primary Examiner* — Gabriel Agared
(74) *Attorney, Agent, or Firm* — Tucker Ellis LLP

(57) ABSTRACT

A drive circuit for a brushless motor is described. The drive circuit includes a converter for connection to a phase winding of the motor, and a controller. The converter includes a plurality of switches and the controller controls the states of the switches to configure the converter in one of a plurality of configurations. In a first configuration, current is permitted to flow through the phase winding in a first direction and in a second opposite direction. In a second configuration, current is permitted to flow through the phase winding in the first direction and is prevented from flowing through the phase winding in the second direction. The controller includes an input for receiving a signal indicative of current in the converter, and the controller configures the converter
(Continued)

from the first configuration to the second configuration in response to a characteristic of the current.

19 Claims, 12 Drawing Sheets

(51) Int. Cl.
*H02P 6/26* (2016.01)
*H02P 27/04* (2016.01)

(58) Field of Classification Search
USPC .................................................. 318/400.3
See application file for complete search history.

(56) References Cited

U.S. PATENT DOCUMENTS

| | | | |
|---|---|---|---|
| 2007/0035265 | A1 | 2/2007 | Balog et al. |
| 2011/0254484 | A1* | 10/2011 | Dai ............................ H02P 6/34 318/400.13 |
| 2011/0254486 | A1* | 10/2011 | Celik ......................... H02P 6/14 318/400.14 |
| 2013/0314014 | A1* | 11/2013 | Tremel .................. H02P 29/0241 318/400.22 |
| 2014/0009095 | A1* | 1/2014 | Greetham ................ H02P 29/64 318/473 |
| 2016/0028334 | A1* | 1/2016 | Greetham ................ H02P 6/085 318/400.27 |
| 2016/0261214 | A1* | 9/2016 | Greetham ................. H02P 6/14 |
| 2016/0308530 | A1 | 10/2016 | Lee et al. |
| 2017/0170758 | A1* | 6/2017 | Bateman .................... H02P 6/22 |
| 2019/0238130 | A1 | 8/2019 | Botti et al. |
| 2019/0273455 | A1* | 9/2019 | Lau ........................... H02M 1/12 |

FOREIGN PATENT DOCUMENTS

| | | |
|---|---|---|
| EP | 2965420 A2 | 1/2016 |
| EP | 3082239 A1 | 10/2016 |
| EP | 3522374 A1 | 8/2019 |
| JP | 2005-045912 A | 2/2005 |
| JP | 2007295753 A | 11/2007 |
| JP | 2010-154715 A | 7/2010 |
| JP | 2010-239765 A | 10/2010 |
| JP | 2011120372 A | 6/2011 |
| WO | 2009/153965 A1 | 12/2009 |
| WO | 2014/135903 A2 | 9/2014 |
| WO | 2018/188746 A1 | 10/2018 |
| WO | 2020/004030 A1 | 1/2020 |
| WO | 2022/117989 A1 | 6/2022 |

OTHER PUBLICATIONS

Search Report received for GB Application No. 2019089.8, mailed on May 21, 2021, 2 pages.
Search Report received for GB Application No. 2019091.4, mailed on Mar. 26, 2021, 1 page.
Cittadini et al., "A Matrix Coverter Switching Controller for Low Losses Operation Without Snubber Circuits," Proceedings of 7th European Conference On Power Electronics and Applications, vol. 4, Sep. 8, 1997, pp. 4199-4203.
Examination Report received for GB Application No. 2019091.4, mailed on Mar. 10, 2023, 3 pages.
International Search Report and Written Opinion received for PCT Patent Application No. PCT/GB2021/052947, mailed on Jan. 21, 2022, 11 pages.
International Search Report and Written Opinion received for PCT Patent Application No. PCT/GB2021/052951, mailed on Jan. 26, 2022, 11 pages.
International Search Report and Written Opinion received for PCT Patent Application No. PCT/GB2021/052944, mailed on Jan. 20, 2022, 10 pages.
International Search Report and Written Opinion received for PCT Patent Application No. PCT/GB2021/052945, mailed on Jan. 21, 2022, 11 pages.
International Search Report and Written Opinion received for PCT Patent Application No. PCT/GB2021/052948, mailed on Feb. 24, 2022, 11 pages.
International Search Report and Written Opinion received for PCT Patent Application No. PCT/GB2021/052949, mailed on Jan. 26, 2022, 11 pages.
International Search Report and Written Opinion received for PCT Patent Application No. PCT/GB2021/052950, mailed on Jan. 26, 2022, 10 pages.
Morita T et al: "650 V 3.1 mOcm 2 GaN-based monolithic bidirectional switch using normally-off gate injection transistor." 2007 IEEE International Electron Devices Meeting. IEEE, 2007.

* cited by examiner

| Voltage Polarity | Current Polarity | SW1 | SW2 | SW3 | SW4 |
|---|---|---|---|---|---|
| +ve | +ve | OFF | D2 | D2 | OFF |
| +ve | -ve | D2 | OFF | OFF | D2 |
| -ve | +ve | D1 | OFF | OFF | D1 |
| -ve | -ve | ON | D1 | D1 | ON |

DRIVE CIRCUIT FOR A BRUSHLESS MOTOR

CROSS-REFERENCE TO PRIOR APPLICATION

This application is a § 371 National Stage Application of PCT International Application No. PCT/GB2021/052950 filed Nov. 15, 2021, which claims the priority of United Kingdom Application No. 2019089.8, filed Dec. 3, 2020, each of which are herein incorporated by reference in their entirety.

FIELD OF THE INVENTION

The present invention relates to a drive circuit for a brushless motor.

BACKGROUND OF THE INVENTION

A drive circuit for a brushless motor is responsible for controlling the excitation of phase windings of the motor.

SUMMARY OF THE INVENTION

The present invention provides a drive circuit for a brushless motor, the drive circuit comprising: a converter for connection to a phase winding of the motor, the converter comprising a plurality of switches; and a controller for controlling the switches to configure the converter in one of a plurality of configurations comprising: a first configuration in which current is permitted to flow through the phase winding in a first direction and in a second opposite direction; and a second configuration in which current is permitted to flow through the phase winding in the first direction and is prevented from flowing through the phase winding in the second direction, wherein the controller comprises an input for receiving a signal indicative of current in the converter, and the controller configures the converter from the first configuration to the second configuration in response to a characteristic of the current.

By controlling the converter in this way, improvements in electrical efficiency may be achieved, particularly when the drive circuit is coupled to a supply voltage having a high ripple (e.g. a DC voltage having high ripple or an AC voltage). For example, when the converter is in the first configuration, the phase winding may be excited by the supply voltage. As the rotor of the motor rotates, a back EMF may be induced in the phase winding. When the magnitude of the supply voltage is relatively low, the magnitude of the back EMF may exceed the supply voltage. As a result, the magnitude and polarity of the phase current can become uncontrolled. Additionally, the phase current at this point is predominantly reactive since, with relatively little or no supply voltage, there is relatively little or no active power. This reactive current can be significant and may impact the efficiency of the motor system.

The controller therefore configures the converter from the first configuration to the second configuration in response to a characteristic of the current. For example, the controller may configure the converter from the first configuration to the second configuration when the current begins to plateau of decrease. In the second configuration, current is permitted to flow through the phase winding in the first direction only. As a result, should the back EMF drive the current to zero, the current is then clamped and a reversal in the polarity of the current is prevented. With this particular configuration sequence, current may continue to be drawn from a power supply even when the magnitude of the supply voltage is low (at troughs in the DC voltage or at zero-crossings in the AC voltage). However, current in the converter is now controlled, with reversal in the polarity of the current prevented.

Conceivably, the first configuration may be omitted and the converter may be configured in the second configuration in order to excite the phase winding. However, the efficiency of the converter is likely to be higher when in the first configuration. This is because conduction losses associated with the switches of the converter are likely to be lower when conducting in both directions.

The controller may configure the converter from the first configuration to the second configuration when a magnitude or a rate of change of the current is greater than a threshold. Accordingly, the controller may configure the converter to the second configuration when it appears (from the magnitude or the rate of change) that the current in the converter is likely to fall to zero.

The plurality of configurations may comprise a third configuration in which current is prevented from flowing through the phase winding in the first direction and the second direction, and the controller may configure the converter from the second configuration to the third configuration. With current decreasing in the second configuration, the converter may transition to the third configuration when the current reaches zero (e.g. after a period of time or by monitoring the current). With the converter conducting in neither direction, the drive circuit may then safely transition to another state.

The controller may configure the converter from the second configuration to the third configuration when a magnitude of the current is zero. This then ensures a safe transition from the second configuration to the third configuration.

Each of the switches may have four states: (i) ON in which the switch is conductive in both a first direction and a second direction, (ii) D1 in which the switch is conductive in the first direction and non-conductive in the second direction, (iii) D2 in which the switch is non-conductive in the first direction and conductive in the second direction, and (iv) OFF in which the switch is non-conductive in both the first direction and the second direction. Moreover, in the first configuration, the states of a pair of switches may be ON and the states of another pair of switches may be OFF; and in the second configuration, the states of a pair of switches may be one of D1 and D2 and the states of another pair of switches may be OFF.

The switches can therefore be controlled in both directions (i.e. can be made conductive in both directions and can be made non-conductive in both directions).

As a result, the drive circuit is capable of applying a voltage of either polarity to the phase winding, irrespective of the polarity of the voltage across the converter. That is to that, irrespective of the polarity of the supply voltage, the drive circuit is capable of applying both a positive voltage to the phase winding in order to excite the phase winding in a first direction (e.g. left to right), and a negative voltage to the phase winding in order to excite the phase winding in a second opposite direction (e.g. right to left). As a result, the drive circuit may be used with an AC power supply without the need for a rectifier, PFC stage or DC link capacitor.

Such switches do, however, present challenges when managing the current in the converter. The controller configures the converter in a sequence of configurations that help manage the current. In particular, in the first configuration, the states of a pair of switches are ON and the states of another pair of switches are OFF. As a result, the phase winding may be excited by the supply voltage. In the second configuration, the states of a pair of switches are one of D1 and D2 and the states of another pair of switches are OFF. By having a pair of switches that operate in a diode state (i.e. D1 or D2), a path continues to be provided for current in the converter. However, should the current decrease to zero, the switches act to clamp and prevent the reversal of current.

The controller may comprise an input for receiving a signal indicative of a polarity of a voltage, and the controller may configure the converter in the second configuration such that the states of switches are one of D1 and D2 according to the polarity of the voltage. The particular choice of D1 or D2 therefore depends on the polarity of the supply voltage and is chosen so that the switches are forward biased by the supply voltage. As a result, current continues to flow in the same direction as before. However, when the magnitude of the phase current reaches zero, the switches are now reverse biased by the back EMF and the current is clamped at zero.

The converter may comprise a plurality of legs, and each leg may comprise a high-side switch and a low-side switch. Each pair of switches in the first configuration and in the second configuration may then comprise a high-side switch of one leg and a low-side switch of another leg.

In the first configuration, the states of a first pair of switches may be ON and the states of a second pair of switches may be OFF; and in the second configuration, the states of the first pair of switches may be one of D1 and D2 and the states of the second pair of switches may be OFF. As a result, the phase winding may be excited by the supply voltage when in the first configuration. Moreover, the state of the switches in the second configuration may be forward biased by the supply voltage such that the phase winding continues to be excited by the supply voltage. Should the current subsequently fall to zero owing to the back EMF, the switches are then reverse biased and prevent the reversal of current.

Alternatively, in the first configuration, the states of a first pair of switches may be ON and the states of a second pair of switches may be OFF; and in the second configuration, the states of the first pair of switches may be OFF and the states of the second pair of switches may be one of D1 and D2. Again, the phase winding may be excited by the supply voltage when in the first configuration. However, when in the second configuration, the state of the switches may be reverse biased by the supply voltage. A path is nevertheless provided for the current in the converter. As a result, the self-induced voltage across the phase winding causes current to be driven from the phase winding to the power supply. The magnitude of the current in the converter therefore decreases. When the current reaches zero, the current is again clamped by the switches.

The plurality of configurations may comprise an intermediate configuration in which the states of the first pair of switches are ON and the states of the second pair of switches are one of D1 and D2. The controller, in configuring the converter from the first configuration to the second configuration, may then configure the converter from the first configuration to the intermediate configuration, and then from the intermediate configuration to the second configuration. As a result, the converter may transition safely from the first configuration to the second configuration. In particular, a path for current in the converter is maintained at all times.

The present invention also provides a drive circuit for a brushless motor, the drive circuit comprising: a converter for connection to a phase winding of the motor, wherein the converter comprises a plurality of legs, each leg comprises a high-side switch and a low-side switch, and each switch comprises four states corresponding to: (i) ON in which the switch is conductive in both a first direction and a second direction, (ii) D1 in which the switch is conductive in the first direction and non-conductive in the second direction, (iii) D2 in which the switch is non-conductive in the first direction and conductive in the second direction, and (iv) OFF in which the switch is non-conductive in both the first direction and the second direction; and a controller for controlling the states of the switches to configure the converter in one of a plurality of configurations comprising: a first configuration in which the states of the high-side switch of a first leg and the low-side switch of a second leg are ON, and the states of the low-side switch of the first leg and the high-side switch of the second leg are OFF; and a second configuration in which (i) the states of the high-side switch of the first leg and the low-side switch of the second leg are one of D1 and D2, and the states of the low-side switch of the first leg and the high-side switch of the second leg are OFF, or (ii) the states of the high-side switch of the first leg and the low-side switch of the second leg are OFF, and the states of the low-side switch of the first leg and the high-side switch of the second leg are the other of D1 and D2, wherein the controller configures the converter in the first configuration and subsequently configures the converter from the first configuration to the second configuration.

As noted, by providing switches that can be controlled in both directions (i.e. can be made conductive in both directions and can be made non-conductive in both directions), the drive circuit is capable of applying a voltage of either polarity to the phase winding, irrespective of the polarity of the voltage across the converter. As a result, the drive circuit may be used with an AC power supply without the need for a rectifier, PFC stage or DC link capacitor. However, having switches that are non-conductive in both directions present challenges when managing the inductive energy stored in the motor, as well as any energy that may be generated by the motor. The controller therefore configures the converter in a sequence of configurations that better manages current in the converter to improve the electrical efficiency of the system. In particular, when the converter is in the first configuration, the phase winding may be excited and current in the converter may increase. The controller may then subsequently configure the converter to the second configuration. When in the second configuration, a path continues to be provided for current in the converter, i.e. current is permitted to flow through the phase winding in the same direction as that in the first configuration. However, current is now prevented from flowing through the phase winding in the opposite direction. As a result, current in the converter is better controlled. In particular, reversal in the polarity of the current may be prevented.

BRIEF DESCRIPTION OF THE DRAWINGS

Embodiments will now be described, by way of example, with reference to the accompanying drawings in which.

DETAILED DESCRIPTION OF THE INVENTION

Figure 1:
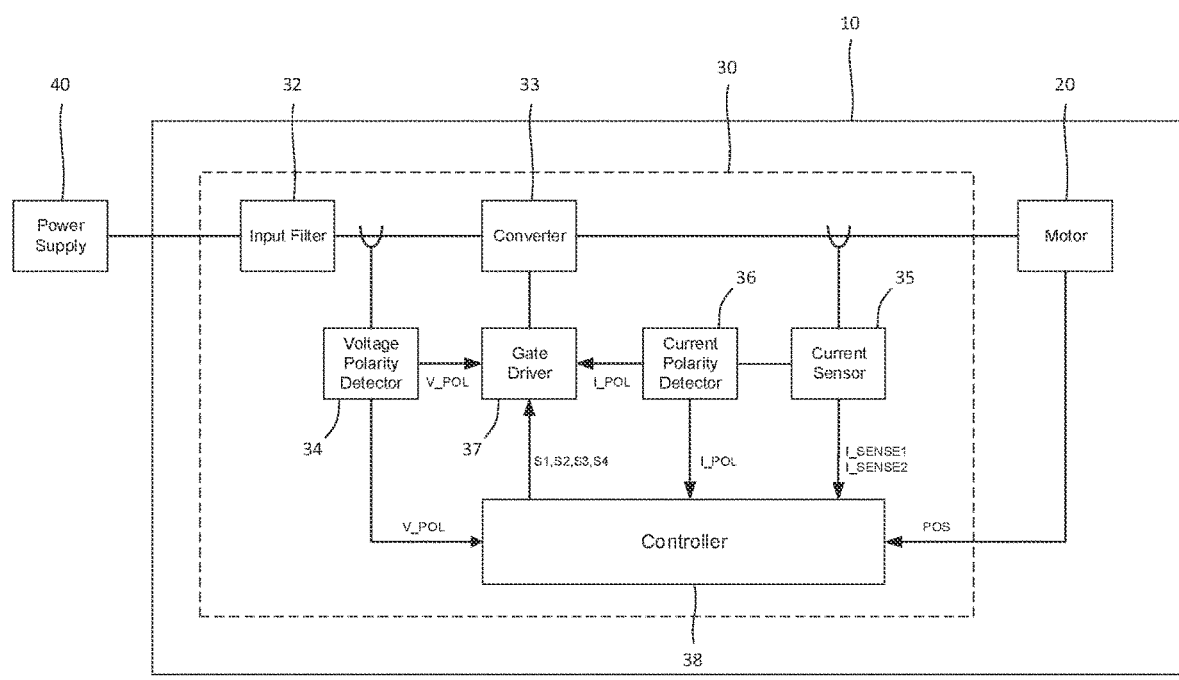
FIG. 1 is a block diagram of a motor system.
Figure 2:
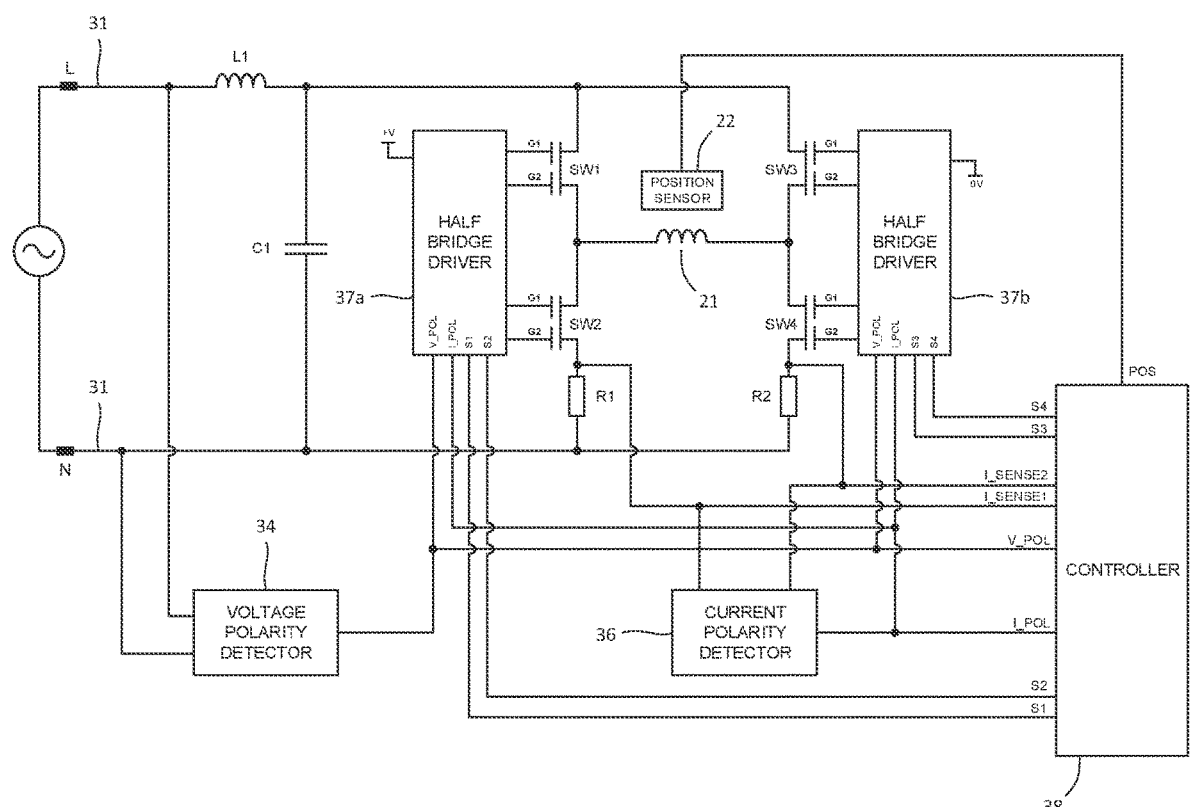
FIG. 2 is a schematic diagram of the motor system.

The motor system 10 of FIGS. 1 and 2 comprises a brushless motor 20 and a drive circuit 30. The motor system 10 is powered by an AC power supply 40, such as a domestic mains supply.

The brushless motor 20 is a permanent-magnet motor and comprises, among other things, a phase winding 21 and a position sensor 22. The position sensor 22 senses the angular position of a rotor of the motor 20 and outputs the signal POS. Suitable examples for the position sensor 22 include a Hall-effect sensor or optical encoder.

The drive circuit 30 comprises a pair of power lines 31, an input filter 32, a converter 33, a voltage polarity detector 34, a current sensor 35, a current polarity detector 36, a gate driver 37 and a controller 38.

The power lines 31 are intended to be connected to the live and neutral terminals of the AC power supply 40. The power lines 31 thus carry an alternating voltage.

The input filter 32 comprises a capacitor C1 and an inductor L1. The capacitor C1 acts to smooth the relatively high switching effects of the converter. Additionally, the capacitor C1 provides a store for any energy generated by the motor 2; this is discussed in further detail below. The capacitor C1 is not required to smooth the AC voltage at the fundamental frequency. Consequently, a capacitor of relatively low capacitance may be used. The inductor L1 acts to smooth any residual current ripple. The inductor L1 is intended to reduce ripple at the motor frequency, and thus an inductor of relatively low inductance may be used, particularly when the motor 20 operates at relatively high speeds or has a relatively high number of poles.

The converter 33 is a single-phase full-bridge converter, sometimes referred to as an H-bridge converter. The converter 33 is connected to the phase winding 21 of the motor 20 and comprises two legs connected in parallel across the power lines 31. Each leg comprises a high-side switch SW1,SW3 and a low-side switch SW2,SW4.

Each of the switches SW1-SW4 is bidirectional and comprises four states: ON, D1, D2, and OFF. When the state of a switch is ON, the switch is conductive in both a first direction and a second direction. When the state of the switch is D1, the switch is conductive in the first direction and non-conductive in the second direction. Conversely, when the state of the switch is D2, the switch is non-conductive in the first direction and conductive in the second direction. D1 and D2 may therefore be regarded as diode states. With the particular arrangement of switches shown in FIG. 2, the first direction may be regarded as downward (i.e. D1=downward conducting), and the second direction may be regarded as upward (i.e. D2=upward conducting). Finally, when the state of the switch is OFF, the switch is non-conductive in both the first direction and the second direction.

Figure 3:
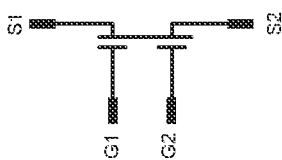
FIG. 3 details different states of a switch of the motor system.

FIG. 3 illustrates the different states of each switch, along with the equivalent circuit.

In comparison to a MOFSET having a body diode or an IGBT having an equivalent antiparallel diode, the bidirectional switches have two additional switching states. For example, when a MOSFET is turned ON, the switch conducts in both directions. When the MOSFET is turned OFF, the switch continues to conduct in one direction owing to the inherent body diode. In contrast to the bidirectional switch described above, the MOSFET does not have an open-circuit state in which the switch is non-conductive in both directions. Additionally, whilst the MOSFET is capable of conducting in a first direction only when turned OFF (i.e. through the body diode), the switch is not capable of conducting in a second opposite direction only.

As described below in more detail, the provision of a converter 33 having bidirectional switches has the advantage that, irrespective of the polarity of the voltage on the power lines, the switches may be controlled such that a voltage of either polarity may be applied to the phase winding. As a result, the drive circuit may be used with an AC power supply without the need for a rectifier. However, the absence of antiparallel diodes presents challenges when managing the inductive energy stored in the motor as well as any energy that may be generated by the motor.

Each switch may comprise a gallium nitride switch, which has a relatively high breakdown voltage and is thus well-suited for operation at mains voltages. Nevertheless, other types of bidirectional switch capable of being controlled in both directions may be used.

The voltage polarity detector 34 detects the polarity of the supply voltage and outputs the signal V_POL. V_POL may be a digital signal that is logically high when the polarity of the supply voltage is, for example, positive and logically low when the polarity is negative.

Suitable examples for the voltage polarity detector 34 include a comparator referenced to ground or a commercially available integrated package, perhaps providing electrical isolation.

The current sensor 35 comprises a pair of sense resistors R1,R2, each resistor being located on a leg of the converter. The voltages across the sense resistors R1,R2 are output as current sense signals, I_SENSE1 and I_SENSE2. The signals provide a measure of the current in the converter and the phase winding. Whilst the current sensor comprises a pair of sense resistors, it will be appreciated that other means may be used to sense current in the converter and phase winding, such as a current transducer or current transformer.

The current polarity detector 36 detects the polarity of the current in the converter 33 and phase winding 21 and outputs the signal I_POL. I_POL may be a digital signal that is logically high when the polarity of the current is, for example, positive and logically low when the polarity is negative. In the schematic of FIG. 2, the polarity of the current may be said to be positive when current flows through the phase winding 21 in a direction from left to right, and negative when current flows in a direction from right to left. The current polarity detector 36 may, in one example, comprise a comparator having I_SENSE1 and I_SENSE2 as inputs.

The gate driver 37 is responsible for driving the switches SW1-SW4 of the converter 33. The gate driver 37 of the illustrated embodiment comprises a pair of half-bridge drivers 37a,37b, each of which is responsible for driving the switches of a respective leg of the converter 33. However, the gate driver 37 could conceivably comprise a single, full-bridge driver. Each of the half-bridge drivers 37a,37b comprises a plurality of inputs for receiving input signals, and a plurality of outputs for outputting gate signals. In response to the input signals, the half-bridge driver 37a,37b generates gate signals for driving the switches of a leg of the converter. Each switch comprises two gates and therefore the half-bridge driver 37a,37b generates a pair of gate signals for each switch.

The controller 38 is responsible for controlling the operation of the motor system 10. The controller 38 comprises a plurality of inputs for receiving input signals, and a plurality of outputs for outputting control signals. The input signals received by the controller 38 include the position signal, POS, the voltage polarity signal, V_POL, the current polarity signal, I_POL, and the current sense signals, I_SENSE1 and I_SENSE2. In response to the input signals, the controller 38 generates and outputs four control signals, S1-S4. Each control signal is used to control the state of a respective switch SW1-SW4 of the converter 33. Each switch has four states, namely ON, D1, D2 and OFF. Accordingly, each control signal has four levels. The control signals are output to the gate driver 37, which in response drives the switches SW1-SW4. As explained below, the controller 38 outputs the control signals so as to configure the converter 33 in one of a plurality of different configurations.

Operation of the motor system 1 will now be described.

In order to excite the phase winding 21, the controller 38 configures the converter 33 in a configuration in which the high-side switch of a first leg and the low-side switch of a second leg of the converter are ON, and the low-side switch of the first leg and the high-side switch of the second leg are OFF. The particular choice of switches that are turned to ON depends on the required direction of excitation and the polarity of the supply voltage, as determined by the signal V_POL. For example, in order to excite the phase winding 21 from left to right, switches SW1 and SW4 are turned ON when the polarity of the supply voltage is positive, and switches SW2 and SW3 are turned ON when the polarity of the supply voltage is negative. Conversely, in order to excite the phase winding 21 from right to left, switches SW2 and SW3 are turned ON when the polarity of the supply voltage is positive, and switches SW1 and SW4 are turned ON when the polarity of the supply voltage is negative.

The controller 38 is therefore able to configure the converter 33 such that, irrespective of the polarity of the supply voltage, the phase winding 21 may be excited in either direction, i.e. a voltage of either polarity may be applied to the phase winding 21. The drive circuit 30 is therefore able to excite the phase winding 21 using an AC supply voltage without the need for a rectifier or PFC stage.

In order to freewheel the phase winding 21, the controller 38 configures the converter 33 in a further configuration in which either (i) the high-side switches of the first leg and the second leg are ON, and the low-side switches of the first leg and the second leg are OFF, or (ii) the low-side switches of the first leg and the second leg are ON, and the high-side switches of the first leg and the second leg are OFF. In both scenarios, a path is provided for current in the phase winding 21 to freewheel or circulate around the converter 33. In the first scenario in which the high-side switches are ON, the current freewheels around the high-side loop of the converter 33. In the second scenario in which the low-side switches are ON, the current freewheels around the low-side loop of the converter 33. In the schematic illustrated in FIG. 2, the sense resistors R1,R2 of the current sensor are located on the lower part of the legs of the converter 33. Accordingly, by freewheeling around the low-side loop of the converter 33, the controller 38 is able to sense the current during freewheeling, as well as excitation. Nevertheless, freewheeling around the high-side loop of the converter 33 is perfectly feasible, particularly if current sensing is not required during freewheeling or if the current is sensed by other means.

During normal operation, the controller 38 may control the converter 33 so as to repeatedly change between excitation and freewheeling. For example, the controller 38 may configure the converter 33 so as to excite the phase winding 21 for a set period of time or until current in the phase winding 21 exceeds an upper threshold, at which point the controller 38 may configure the converter 33 so as to freewheel the phase winding 21. Freewheeling may then continue for a set period of time or until such time as the current in the phase winding 21 drops below a lower threshold, at which point the controller 38 may configure the converter 33 so as to excite the phase winding 21. This process of sequentially exciting and freewheeling the phase winding 21 may then be repeated.

The switches SW1-SW4 of the converter 33 do not have antiparallel diodes, which presents challenges when changing between excitation and freewheeling. For example, consider the situation in which switches SW1 and SW4 are ON. In order to freewheel around the low-side loop of the converter 33, one would typically turn OFF switch SW1 and then turn ON switch SW2. However, when SW1 is turned OFF, a path is no longer provided for the inductive energy stored in the motor 20. For switches that include a body or antiparallel diode, this problem does not arise because a path continues to be provided by the diode. However, the lack of a diode present challenges, not just for the inductive energy stored in the motor 20 but for any energy that may be generated by the motor 20.

The controller 38 therefore configures the converter 33 in a sequence of configurations when moving between different operating states.

Excitation to Freewheeling

Let us first consider the sequence of configurations when moving from excitation to freewheeling.

The sequence begins with the converter 33 in a first configuration in which the high-side switch of a first leg and the low-side switch of a second leg of the converter are ON, and the low-side switch of the first leg and the high-side switch of the second leg are OFF.

This first configuration causes the phase winding 21 to be excited by the supply voltage.

As noted above, the direction of excitation (i.e. the polarity of the applied voltage) will depend on which of the switches are turned ON and the polarity of the supply voltage.

FIG. 4(a) illustrates a particular example of the converter in the first configuration. In this particular example, switches SW1 and SW4 are turned ON, and switches SW2 and SW3 are turned OFF. The polarity of the supply voltage is positive, and therefore the phase winding is excited in a direction from left to right.

The controller 38 then configures the converter 33 in a second configuration in which the high-side switch of the first leg and the low-side switch of the second leg are ON, one of the low-side switch of the first leg and the high-side switch of the second leg is OFF, and the other of the low-side switch of the first leg and the high-side switch of the second leg is D1 or D2. The only change that has occurred over the first configuration is that one of the switches that was previously OFF is now D1 or D2. The particular choice of switch will depend on whether freewheeling occurs around the high-side loop or the low-side loop of the converter. The particular choice of diode state (i.e. D1 or D2) depends on the polarity of the supply voltage and is chosen such that the switch is reverse biased by the supply voltage. Accordingly, if the polarity of the supply voltage is positive, the switch is turned from OFF to D2 (i.e. upward conducting). Conversely, if the polarity of the supply voltage is negative, the switch is turned from OFF to D1 (i.e. downward conducting). Two of the switches are still in an ON state and therefore the phase winding 21 continues to be excited in the second configuration.

FIG. 4(b) illustrates a particular example of the converter in the second configuration. In this particular example, the polarity of the supply voltage is positive and freewheeling will occur around the low-side loop. Accordingly, the low-side switch SW2 is turned from OFF to D2.

The controller 38 then configures the converter 33 in a third configuration in which either (i) the low-side switches of the first leg and the second leg are OFF, the high-side switch of the first leg is ON, and the high-side switch of the second leg is D1 or D2, or (ii) the high-side switches of the first leg and the second leg are OFF, the low-side switch of the second leg is ON, and the low-side switch of the first leg is D1 or D2. The only change that has occurred over the second configuration is that one of the switches that was previously ON is now OFF. The particular choice of switch to change from ON to OFF depends on whether freewheeling occurs around the high-side or the low-side loop of the converter 33. When the converter 33 is in the third configuration, the phase winding 21 is no longer excited by the supply voltage and the phase current freewheels or circulates around either the high-side or low-side loop of the converter 33.

FIG. 4(c) illustrates a particular example of the converter in the third configuration. Freewheeling occurs around the low-side loop, and therefore the high-side switch SW1 is turned from ON to OFF.

When in the third configuration, current in the converter 33 flows through a first switch in an ON state and a second switch in a diode state (i.e. D1 or D2). For example, in the example of FIG. 4(c), current flows down through switch SW4 which is in an ON state, and up through switch SW2 which is in a diode state. Freewheeling may continue in this manner with the converter 33 in the third configuration. However, conduction losses are likely to be lower when the switch is in an ON state versus a diode state. Accordingly, the controller 38 may configure the converter 33 in a fourth configuration, in which either (i) the high-side switches of the first leg and the second leg are ON, and the low-side switches of the first leg and the second leg are OFF, or (ii) the low-side switches of the first leg and the second leg are ON, and the high-side switches of the first leg and the second leg are OFF. The only change that has occurred over the third configuration is that the switch that was previously in a diode state is now ON. Current continues to freewheel around the high-side or the low-side loop of the converter 33 when in the fourth configuration. However, current now flows through switches that are in an ON state, thereby reducing conduction losses.

FIG. 4(d) illustrates a particular example of the converter in the fourth configuration. Current continues to freewheel around the low-side loop of the converter and therefore both low-side switches SW2,SW4 are ON.

Freewheeling to Excitation

Next, let us next consider the sequence of configurations when moving from freewheeling to excitation. Moreover, let us consider the situation in which the phase winding is excited in a direction that maintains the phase current in the same direction as that during freewheeling.

The sequence begins with the converter 33 in a first configuration in which either (i) the high-side switches of the first leg and the second leg are ON, and the low-side switches of the first leg and the second leg are OFF, or (ii) the low-side switches of the first leg and the second leg are ON, and the high-side switches of the first leg and the second leg are OFF. Phase current then freewheels around either the high-side or the low-side loop of the converter 33.

FIG. 5(a) illustrates a particular example of the converter in the first configuration. In this particular example, the high-side switches SW1,SW3 are OFF and the low-side switches SW2,SW4 are ON. Current then freewheels around the low-side loop of the converter.

The controller 38 then configures the converter 33 in a second configuration in which either (i) one of the high-side switches of the first leg and the second leg is ON and the other of the high-side switches is D1 or D2, and the low-side switches of the first leg and the second leg are OFF, or (ii) one of the low-side switches of the first leg and the second leg is ON and the other of the low-side switches is D1 or D2, and the high-side switches of the first leg and the second leg are OFF. The only change that has occurred over the first configuration is that one of the switches that was previously ON is now D1 or D2. The particular choice of switch depends on the intended direction of excitation, and therefore depends on the polarity of the supply voltage and the polarity of the phase current. As noted below, this particular switch is not employed (i.e. does not conduct) during excitation and is eventually turned OFF. The diode state of the switch (i.e. D1 or D2) is chosen such that phase current continues to freewheel around either the high-side loop or the low-side loop of the converter. Consequently, the choice of D1 or D2 depends on the leg of the converter to which the switch belongs, and the polarity of the phase current. When the converter is in the second configuration, phase current continues to freewheel around either the high-side or the low-side loop of the converter 33. However, current now flows through a first switch in an ON state and a second switch in a diode state (i.e. D1 or D2).

FIG. 5(b) illustrates a particular example of the converter in the second configuration. In this particular example, switches SW1 and SW3 are OFF, switch SW4 is ON, and switch SW2 is D2. Current therefore continues to freewheel around the low-side loop of the converter through switches SW2 and SW4.

The controller 38 configures the converter 33 in a third configuration in which a high-side switch of a first leg and a low-side switch of a second leg are ON, one of the low-side switch of the first leg and the high-side switch of the second leg is D1 or D2, and the other of the low-side switch of the first leg and the high-side switch of the second leg is OFF. The only change that has occurred over the second configuration is that one of the switches that was previously OFF is now ON. Moreover, the switch that is turned ON is on the same leg as that switch which is in the diode state, be it D1 or D2. The phase winding 21 is now excited by the supply voltage by virtue of the two switches that are in an ON state. The switch that is in the diode state is now reverse biased by the supply voltage.

FIG. 5(c) illustrates a particular example of the converter in the third configuration. In this particular example, switches SW1 and SW4 are ON, switch SW2 is D2, and switch SW3 is OFF.

Excitation could conceivably continue in the third configuration without any further change. However, should the polarity of the supply voltage change, shoot-through would occur along the leg of the converter 33 having the switch in the diode state. Accordingly, the controller 38 configures the converter 33 in a fourth configuration in which the high-side switch of the first leg and the low-side switch of the second leg are ON, and the low-side switch of the first leg and the high-side switch of the second leg are OFF. The only change that has occurred over the third configuration is that the switch that was previously in a diode state (i.e. D1 or D2) is now OFF.

FIG. 5(d) illustrates a particular example of the converter in the fourth configuration, in which switches SW1,SW4 are ON, and switches SW2,SW3 are OFF.

Figure 4:
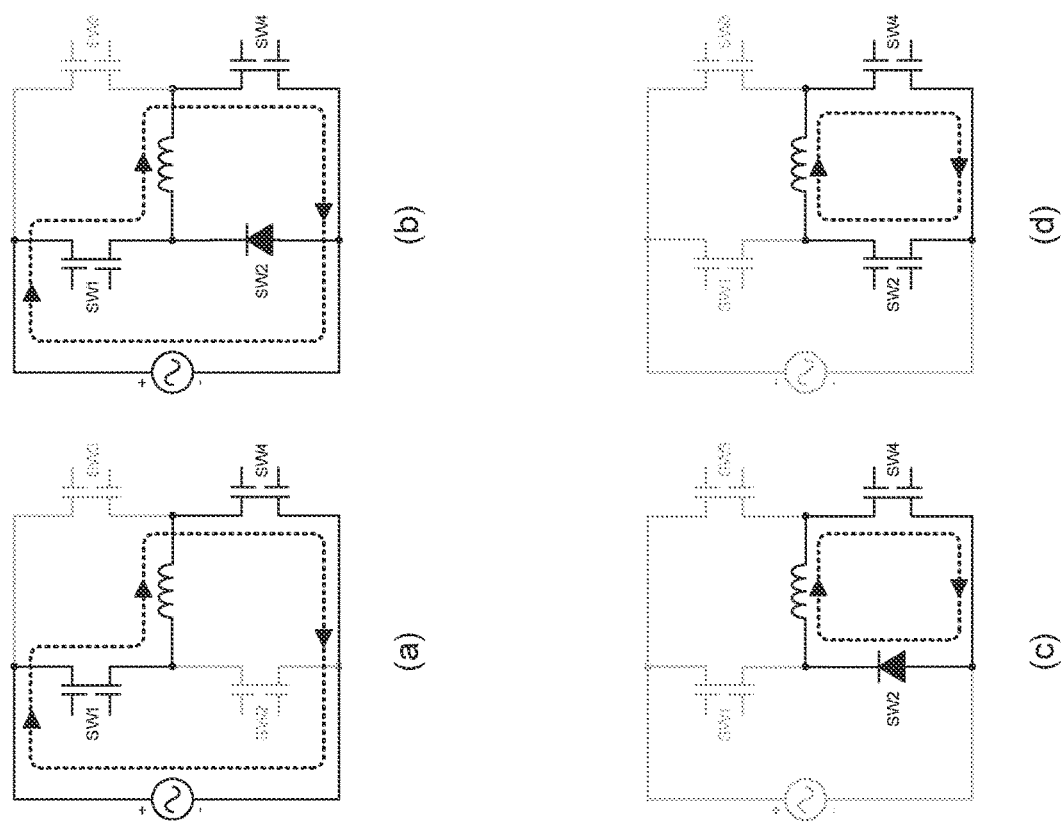
FIG. 4 is a first example of a configuration sequence of a converter of the motor system.
Figure 5:
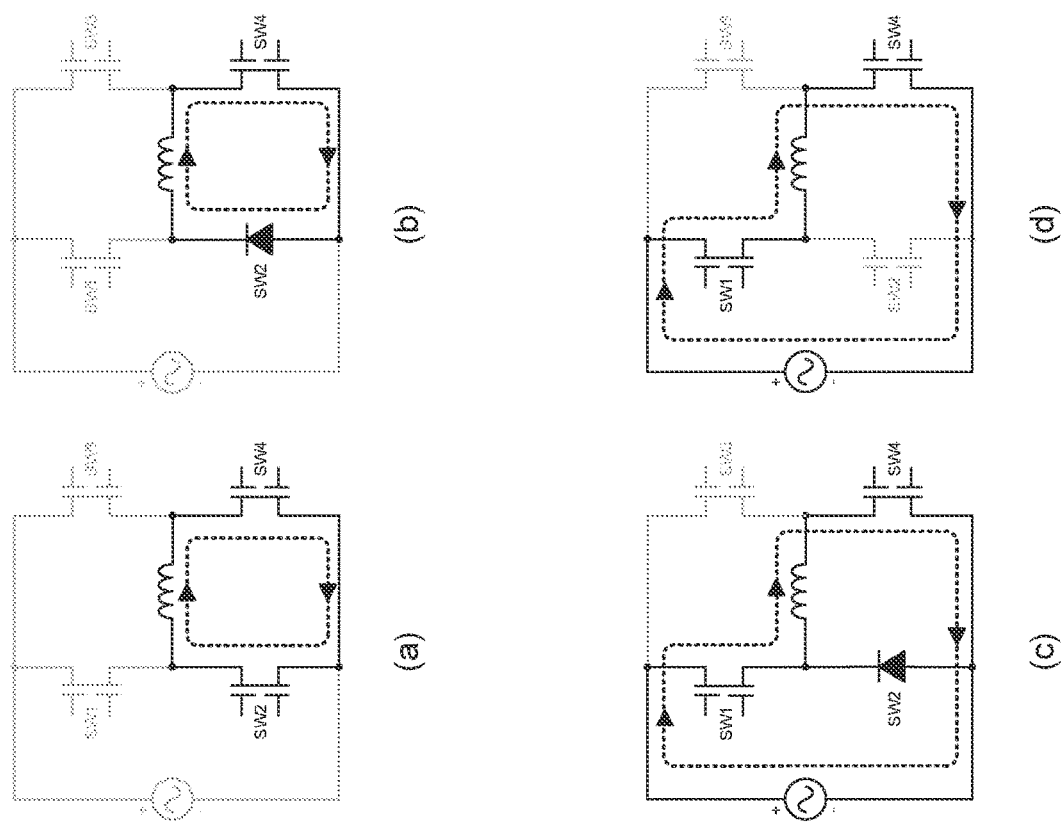
FIG. 5 is a second example of a configuration sequence of the converter.

The particular configuration sequence described here when moving from freewheeling to excitation is the reverse of that described above when moving from excitation to freewheeling. For example, it can be seen that the configuration sequences illustrated in FIGS. 4 and 5 are reverse complements. The controller 38 may therefore be said to configure the converter 33 in a first sequence in order to excite the phase winding 21, and a second reverse sequence in order to freewheel the phase winding 21.

Freewheeling to Reverse Excitation (Commutation)

Let us next consider the sequence of configurations when moving from freewheeling to reverse excitation. In this situation, the phase winding is excited in the opposite direction to that of the phase current, thereby causing current in the phase winding to be commutated.

Again, the sequence begins with the converter 33 in a first configuration in which either (i) the high-side switches of the first leg and the second leg are ON, and the low-side switches of the first leg and the second leg are OFF, or (ii) the low-side switches of the first leg and the second leg are ON, and the high-side switches of the first leg and the second leg are OFF. Phase current therefore freewheels around either the high-side or the low-side loop of the converter 33.

Figure 6:
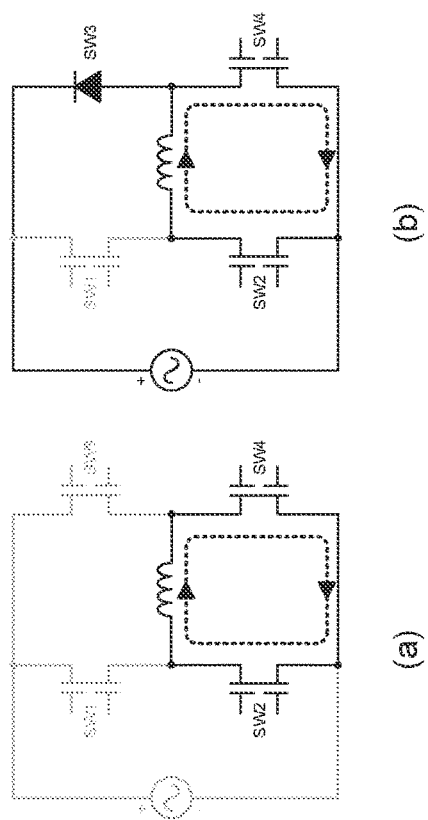
FIG. 6 is a third example of a configuration sequence of the converter.
Figure 6:
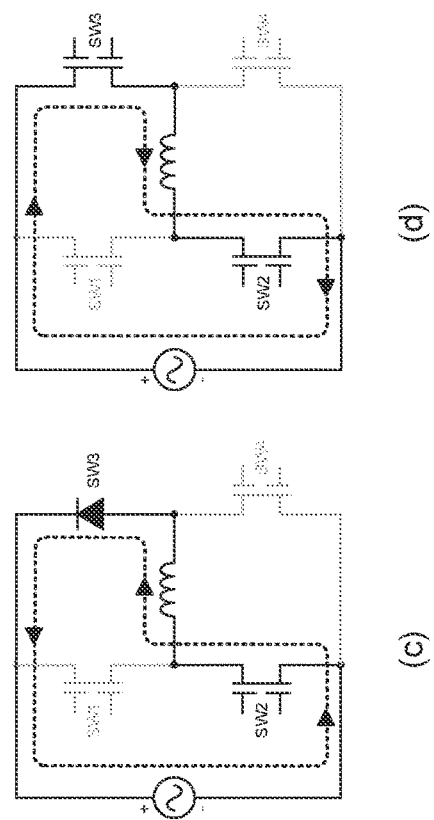

FIG. 6(a) illustrates a particular example of the converter in the first configuration, in which switches SW1,SW3 are OFF and switches SW2, SW4 are ON. Moreover, current freewheels in a clockwise direction around the low-side loop of the converter.

The controller 38 then configures the converter 33 in a second configuration in which either (i) the high-side switches of the first leg and the second leg are ON, one of the low-side switches of the first leg and the second leg is D1 or D2, and the other of the low-side switches is OFF, or (ii) the low-side switches of the first leg and the second leg are ON, one of the high-side switches of the first leg and the second leg is D1 or D2, and the other of the high-side switches is OFF. The only change that has occurred over the first configuration is that one of the switches that was previously OFF is now D1 or D2. The particular choice of switch depends on the intended direction of excitation, and therefore depends on the polarity of the supply voltage. As noted below, this particular switch is employed (i.e. conducts) during excitation and is eventually turned ON. The particular choice of diode state (i.e. D1 or D2) likewise depends on the polarity of the supply voltage and is chosen such that switch is reverse biased by the supply voltage. Accordingly, if the polarity of the supply voltage is positive, the switch is turned from OFF to D2 (i.e. upward conducting). Conversely, if the polarity of the supply voltage is negative, the switch is turned from OFF to D1 (i.e. downward conducting).

FIG. 6(b) illustrates a particular example of the converter in the second configuration, in which switches SW2,SW4 are ON (and therefore current continues to freewheel around the low-side loop of the converter), switch SW1 is OFF and switch SW3 is D2.

The controller 38 configures the converter 33 in a third configuration in which the high-side switch of the first leg and the low-side switch of the second leg are OFF, one of the low-side switch of the first leg and the high-side switch of the second leg is ON, and the other of the low-side switch of the first leg and the high-side switch of the second leg is D1 or D2. The only change that has occurred over the second configuration is that one of the switches that was previously ON is now OFF. Moreover, the switch that is turned OFF is on the same leg as that switch which is in a diode state, be it D1 or D2. When the converter 33 is in the third configuration, inductive energy stored in the motor 20 is transferred to the capacitor C1.

FIG. 6(c) illustrates a particular example of the converter in the third configuration, in which switches SW1,SW4 are OFF, switch SW2 is ON and switch SW3 is D2.

Finally, the controller 38 configures the converter 33 in a fourth configuration in which the high-side switch of the first leg and the low-side switch of the second leg are OFF, and the low-side switch of the first leg and the high-side switch of the second leg are ON. The only change that has occurred over the third configuration is that the switch that was previously in a diode state (i.e. D1 or D2) is now ON. When the converter 33 is in the fourth configuration, the phase winding 21 is excited by the supply voltage in an opposite direction to that previously. Any remaining inductive energy stored in the motor 20 is transferred to the capacitor C1. When all inductive energy is transferred to the capacitor, current in the phase winding commutates.

FIG. 6(d) illustrates a particular example of the converter in the fourth configuration, in which switches SW1 and SW4 are OFF, and switches SW2 and SW3 are ON. As a result, the phase winding is now excited in a direction from right to left.

Excitation to Reverse Excitation (Commutation)

There may be instances when it is desirable or indeed necessary to reverse the direction of excitation (i.e. commutate the phase winding) during excitation, and the controller may employ the following sequence in order to configure the converter.

The sequence begins with the converter 33 in a first configuration in which the high-side switch of a first leg and the low-side switch of a second leg of the converter are ON, and the low-side switch of the first leg and the high-side switch of the second leg are OFF. The phase winding is therefore excited in a direction that depends on the particular choice of switches that are turned ON and by the polarity of the supply voltage.

Figure 7:
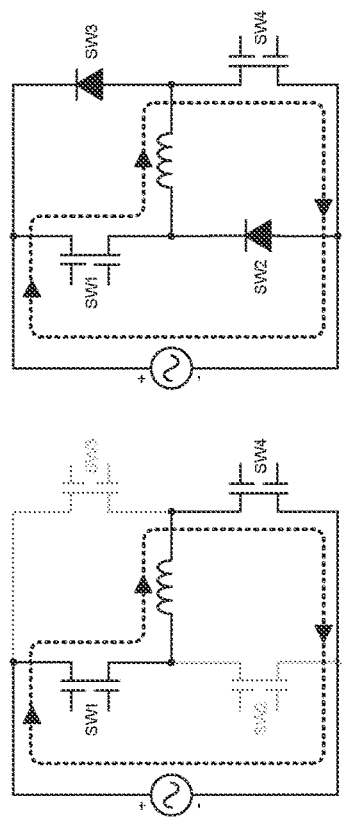
FIG. 7 is a fourth example of a configuration sequence of the converter.
Figure 7:
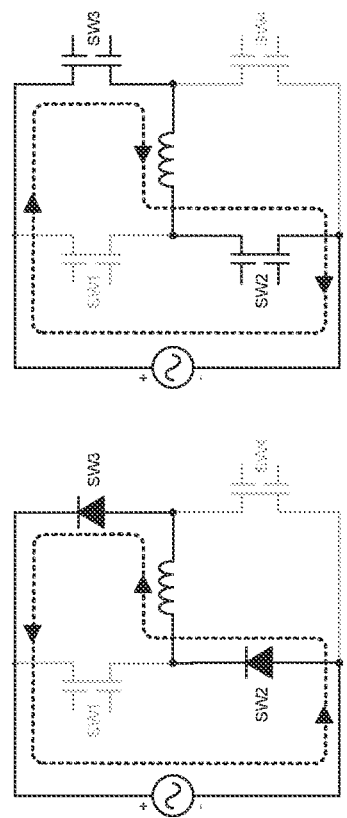

FIG. 7(a) illustrates a particular example of the converter in the first configuration. In this particular example, switches SW1,SW4 are ON, and switches SW2,SW3 are OFF. The polarity of the supply voltage is positive, and therefore the phase winding is excited in a direction from left to right.

The controller 38 then configures the converter 33 in a second configuration in which the high-side switch of the first leg and the low-side switch of the second leg are ON, and the low-side switch of the first leg and the high-side switch of the second leg are D1 or D2.

The only change that has occurred over the first configuration is that both switches that were previously OFF are now D1 or D2. The particular choice of diode state (i.e. D1 or D2) depends on the polarity of the supply voltage and is chosen such that the switches are reverse biased by the supply voltage. Accordingly, if the polarity of the supply voltage is positive, the switches are turned from OFF to D2 (i.e. upward conducting). Conversely, if the polarity of the supply voltage is negative, the switches are turned from OFF to D1 (i.e. downward conducting). When the converter 33 is in the second configuration, the phase winding 21 continues to be excited in the same direction as that of the first configuration.

FIG. 7(b) illustrates a particular example of the converter in the second configuration. In this particular example, the polarity of the supply voltage is positive. Consequently, switches SW1,SW4 are ON, and switches SW2,SW3 are D2 (i.e. upward conducting). The phase winding therefore continues to be excited from left to right.

The controller 38 configures the converter 33 in a third configuration in which the high-side switch of the first leg and the low-side switch of the second leg are OFF, and the low-side switch of the first leg and the high-side switch of the second leg are D1 or D2. The only change that has occurred over the second configuration is that both switches that were previously ON are now OFF. When the converter is in the third configuration, inductive energy stored in the motor 20 is transferred to the capacitor C1 via the switches in the diode state.

FIG. 7(c) illustrates a particular example of the converter in the third configuration, in which switches SW1,SW4 are OFF, and switches SW2,SW3 are D2 (i.e. upward conducting). Inductive energy stored in the motor is then transferred to the capacitor (not shown) via switches SW2 and SW3.

Finally, the controller 38 configures the converter 33 in a fourth configuration in which the high-side switch of the first leg and the low-side switch of the second leg are OFF, and the low-side switch of the first leg and the high-side switch of the second leg are ON. The only change that has occurred over the fourth configuration is that the switches that were previously in a diode state (i.e. D1 or D2) are now ON. When the converter 33 is in the fourth configuration, the phase winding 21 is excited by the supply voltage in an opposite direction to that previously. Any remaining inductive energy stored in the motor 20 is transferred to the capacitor C1. When all inductive energy is transferred to the capacitor, current in the phase winding commutates.

FIG. 7(d) illustrates a particular example of the converter in the fourth configuration, in which switches SW1,SW4 are OFF, and switches SW2,SW3 are ON. As a result, the phase winding is now excited in a direction from right to left.

Reactive Current

As the rotor of the motor 20 rotates, a back EMF is induced in the phase winding 21. Around zero-crossings in the supply voltage, the magnitude of the back EMF may exceed the supply voltage. As a result, the magnitude and polarity of the phase current can become uncontrolled. Additionally, the phase current at this point is predominantly reactive since, with relatively little or no supply voltage, there is relatively little or no active power. This reactive current can be significant and may impact the efficiency of the motor system. The motor 20 may be designed such that machine parameters of the motor, such as the peak back EMF and phase inductance, help mitigate reactive current. However, this inevitably compromises the performance of the motor. As will now be explained, the converter can be configured so as to maintain control of the phase current around zero-crossings in the supply voltage. This then enables the design of the motor to be decoupled from considerations around reactive current.

In one example, the controller 38 may configure the converter 33 such that all switches SW1-SW4 are OFF at or around zero-crossings in the supply voltage. As a result, no phase current flows. There is then no reactive power but equally there is no active power. However, the loss of active power is unlikely to be a problem. Even when phase current is present, active power at or around zero-crossings in the supply voltage is low or zero by virtue of the fact that the magnitude of the supply voltage is low or zero. Consequently, the reduction in total active power as a result of turning OFF all switches is likely to be small and is unlikely to adversely affect the overall performance of the motor.

In motor systems having switches that include a body or antiparallel diode, the phase current cannot be controlled in this way. In particular, the diodes continue to provide a path for reactive current even when the switches are OFF. The motor system described here is therefore capable of controlling the phase current in ways that are simply not possible with other motor systems.

By turning OFF all switches of the converter 33, there are now periods during which no current is drawn from the supply voltage. As a result, the harmonic content of the current drawn from the supply voltage may increase. The controller 38 may therefore configure the converter in a different way such that phase current continues to be controlled whilst better shaping the current drawn from the supply voltage. Two configuration sequences will now be described.

Reactive Current—First Configuration Sequence

The first sequence begins with the converter 33 in a first configuration in which the high-side switch of a first leg and the low-side switch of a second leg of the converter are ON, and the low-side switch of the first leg and the high-side switch of the second leg are OFF. As a result, the phase winding 21 is excited in a direction that depends on the particular choice of switches that are turned ON and by the polarity of the supply voltage.

FIG. 8(a) illustrates a particular example of the converter in the first configuration. In this particular example, switches SW1,SW4 are ON and switches SW2,SW3 are OFF. The polarity of the supply voltage is positive and therefore the phase winding is excited in a direction from left to right.

The controller 38 monitors the magnitude of the current in the phase winding via the current sense signals, I_SENSE1 and I_SENSE2. In the event that the rate of change in the magnitude of the phase current is less than a threshold, the controller 38 configures the converter 33 in a second configuration in which the high-side switch of the first leg and the low-side switch of the second leg of the converter are D1 or D2, and the low-side switch of the first leg and the high-side switch of the second leg are OFF. The only change that has occurred over the first configuration is that both switches that were previously ON are now D1 or D2. The particular choice of diode state (i.e. D1 or D2) depends on the polarity of the supply voltage and is chosen so that the switches are forward biased by the supply voltage. Accordingly, if the polarity of the supply voltage is positive, the switches are turned from ON to D1 (i.e. downward conducting). Conversely, if the polarity of the supply voltage is negative, the switches are turned from ON to D2 (i.e. upward conducting).

FIG. 8(b) illustrates a particular example of the converter in the second configuration. The polarity of the supply voltage is positive, and therefore switches SW1,SW4 are D1, and switches SW2,SW3 are OFF.

The controller 38 continues to monitor the magnitude of the current in the phase winding 21. Should the magnitude of the phase current reach zero, the controller 38 configures the converter 33 in a third configuration in which all switches of the converter 33 are OFF. The controller maintains the converter 33 in the third configuration until it is once again time to excite the phase winding 21.

Figure 9:
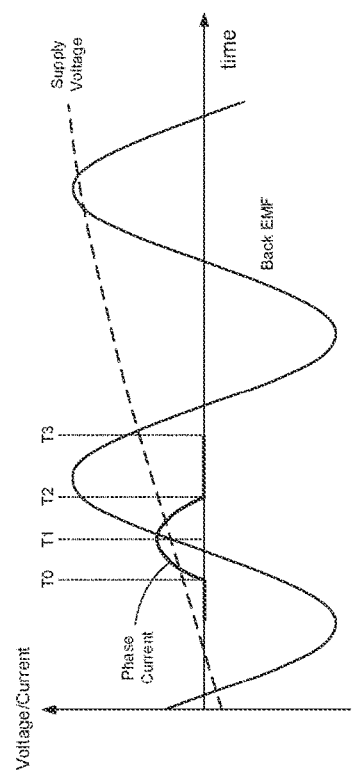
FIG. 9 illustrates example waveforms for supply voltage, back EMF and phase current when employing the configuration sequence of FIG. 8.

Implementation of this particular configuration sequence will now be described with reference to FIG. 9, which illustrates the supply voltage, the back EMF induced in the phase winding, and the phase current.

At T0 the converter is configured in the first configuration and the phase winding is excited (e.g. from left to right). In this particular example, the phase winding is excited at a time when the back EMF has the opposite polarity to that of the supply voltage. As a result, the supply voltage is boosted by the back EMF. The net result is that current in the phase winding rises. In this particular example, the polarity of the phase current is positive. If the phase winding were excited in the opposite direction (e.g. from right to left), the polarity of the phase current would be negative. Nevertheless, the behaviour in the magnitude (i.e. the absolute value) of the phase current would be the same. Between T0 and T1 the magnitude of the back EMF decreases, transitions through zero, and then increases. The polarity of the back EMF has now changed and therefore acts in opposition to the supply voltage. As a result, the rate of change in the magnitude of the phase current decreases over the period T0 to T1. At T1 the magnitude of the back EMF is the same as that of the supply voltage. Moreover, as already noted, the back EMF acts in opposition to the supply voltage. As a result, the rate of change in the phase current is zero at T1. Between T1 and T2 the magnitude of the back EMF is greater than the supply voltage and therefore the magnitude of the phase current decreases, i.e. the rate of change in the magnitude of the phase current is now negative. In the event that the rate of change in the magnitude of the phase current is less than a threshold, the controller configures the converter in the second configuration. In this particular example, the threshold is zero. Consequently, when the rate of change in the magnitude of the phase current becomes negative, the converter is configured in the second configuration. In the second configuration, the switches that were previously ON are now in a diode state. The switches are forward biased by the combination of the supply voltage and the self-induced voltage across the phase winding. As a result, current continues to flow in the same direction as before (e.g. from left to right). When the magnitude of the phase current reaches zero, the switches are now reverse biased by the back EMF. As a result, the phase current is clamped at zero. Finally, between T2 and T3 the controller configures the converter in the third configuration. With all switches now OFF, the phase current remains at zero.

With this particular configuration sequence, current continues to be drawn from the power supply 40, thereby improving the shape of the current waveform. However, the phase current is controlled at all times. In particular, the switches are configured into a diode state which clamps the current at zero and prevents the back EMF from reversing the polarity of the phase current.

Figure 10:
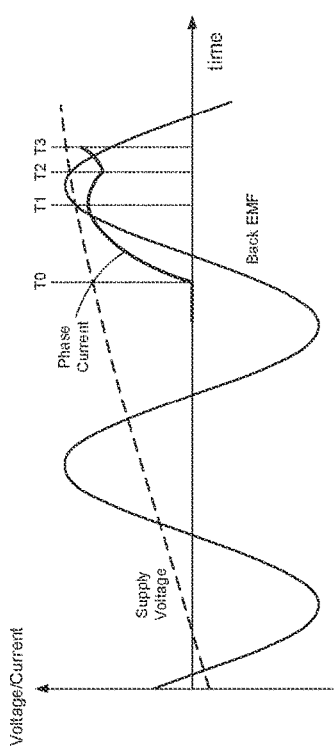
FIG. 10 illustrates further example waveforms for supply voltage, back EMF and phase current when employing the configuration sequence of FIG. 8.

FIG. 10 illustrates a further example of the implementation of this particular configuration sequence.

Again at T0 the converter is configured in the first configuration, the phase winding is excited, and phase current rises. Between T0 and T1 the magnitude of the back EMF decreases, transitions through zero, and then increases. As a result, the rate of change in the magnitude of the phase current decreases over the period T0 to T1. At T1 the magnitude of the back EMF, which now acts in opposition to the supply voltage, is the same as that of the supply voltage and therefore the rate of change in the phase current is zero. Between T1 and T2, the magnitude of the back EMF is greater than the supply voltage and therefore the magnitude of the phase current falls. Again, in this particular example, the controller configures the converter in the second configuration when the rate of change in the magnitude of the phase current is less than zero. Consequently, when the rate of change in the magnitude of the phase current becomes negative, the converter is configured in the second configuration. The switches are forward biased by the combination of the supply voltage and the self-induced voltage across the phase winding and thus current continues to flow. Between T1 and T2, the magnitude of the back EMF rises, peaks, and begins to fall. At T2 the magnitude of the back EMF is again the same as the supply voltage and therefore the rate of change in the phase current is zero. From T2 to T3 the magnitude of the supply voltage is greater than the back EMF and therefore the magnitude of the phase current rises again. Consequently, in contrast to the example of FIG. 9, the phase current never reaches zero. The controller then maintains the converter in the second configuration until it is time to freewheel or commutate the phase winding.

In the example of FIG. 10, switches SW1 and SW4 could have remained ON throughout. Indeed, keeping the switches ON is likely to be beneficial since conduction losses are likely to be higher when the switches are in the diode state. Accordingly, the controller may configure the converter in the second configuration when (i) the rate of change in the magnitude of the phase current is less than a threshold, and (ii) the magnitude of the phase current is less than a further threshold. In this way, the efficiency of the motor system may be improved by switching to the second configuration only under circumstances for which the phase current is likely to fall to zero. In the example illustrated in FIG. 10, the further threshold may be set sufficiently low such that, despite the momentary decrease in the magnitude of the phase current, switches SW1 and SW4 remain ON.

Reactive Current—Second Configuration Sequence

The second sequence again begins with the converter 33 in a first configuration in which the high-side switch of a first leg and the low-side switch of a second leg of the converter are ON, and the low-side switch of the first leg and the high-side switch of the second leg are OFF. The phase winding 21 is therefore excited in a direction that depends on the particular choice of switches that are turned ON and by the polarity of the supply voltage.

FIG. 11(a) illustrates a particular example of the converter in the first configuration. In this particular example, switches SW1,SW4 are ON and switches SW2,SW3 are OFF. The polarity of the supply voltage is positive and therefore the phase winding is excited in a direction from left to right.

The controller 38 monitors the magnitude of the phase current in the converter 33. In the event that the rate of change in the magnitude of the phase current is less than a threshold, the controller 38 configures the converter 33 in a second configuration in which the high-side switch of the first leg and the low-side switch of the second leg of the converter are ON, and the low-side switch of the first leg and the high-side switch of the second leg are D1 or D2. The only change that has occurred over the first configuration is that both switches that were previously OFF are now D1 or D2. The particular choice of D1 or D2 depends on the polarity of the supply voltage and is chosen so that the switches are reverse biased by the supply voltage. Accordingly, if the polarity of the supply voltage is positive, the switches are turned from OFF to D2 (i.e. upward conducting). Conversely, if the polarity of the supply voltage is negative, the switches are turned from OFF to D1 (i.e. downward conducting).

Figure 11:
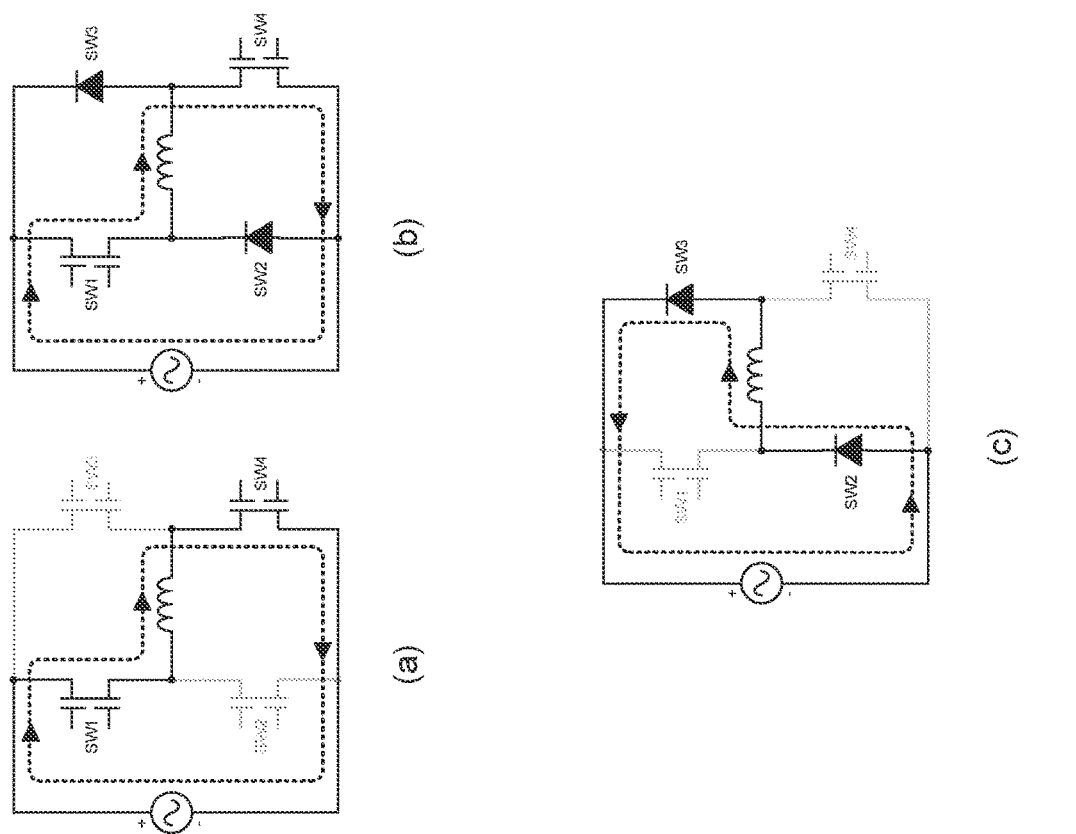
FIG. 11 is a sixth example of a configuration sequence of the converter.

FIG. 11(*b*) illustrates a particular example of the converter in the second configuration. The polarity of the supply voltage is positive and therefore switches SW1,SW4 are ON and switches SW2,SW3 are D2.

The controller 38 then configures the converter 33 in a third configuration in which the high-side switch of the first leg and the low-side switch of the second leg of the converter are OFF, and the low-side switch of the first leg and the high-side switch of the second leg are D1 or D2. The only change that has occurred over the second configuration is that both switches that were previously ON are now OFF. The switches in the diode state (i.e. D1 or D2) are now forward biased by the self-induced voltage across the phase winding. The self-induced voltage is opposed by both the supply voltage and the back EMF. As a result, the magnitude of the phase current decreases.

FIG. 11(*c*) illustrates a particular example of the converter in the third configuration, in which switches SW1,SW4 are now OFF and switches SW2,SW3 continue to be D2.

The controller 38 continues to monitor the phase current in the third configuration. When the magnitude of the phase current is zero, the controller 38 configures the converter 33 in a fourth configuration in which all switches of the converter 33 are OFF.

It will be apparent that the two configuration sequences described in this section are similar. Common to both sequences is the notion that the controller 38 initially configures the converter 33 in a configuration in which a pair of switches are ON (and a pair of switches are OFF) in order to excite the phase winding and drive current through the phase winding 21 in a particular direction. The controller 38 monitors the phase current and, in the event that the rate of change in the magnitude of the phase current is less than a threshold, the controller 38 configures the converter 33 in a further configuration in which a pair of switches are in a diode state (and a pair of switches are OFF) such that phase current continues to flow in the same direction. Although the choice of switches (i.e. SW1/SW4 or SW2/SW3) and the choice of diode state (i.e. D1 or D2) are different in both sequences, common to both is the notion that, when the phase current is zero, the switches are reverse biased by the back EMF such that reversal in the polarity of the phase current is prevented. Although the second sequence includes one additional configuration (i.e. the second configuration), this additional configuration is required merely to safely transition from the first configuration to the third configuration.

Although the two configuration sequences are similar, there are nevertheless differences. When the switches of the first sequence are in the diode state, the switches conduct in the same direction as that of the supply voltage (see, for example FIG. 8(*b*)). Consequently, should the supply voltage subsequently exceed the back EMF, the switches are forward biased and the phase current rises, as illustrated in the example of FIG. 10. By contrast, when the switches of the second sequence are in the diode state, the switches conduct in an opposite direction to that of the supply voltage (see, for example FIG. 11(*b*)). Consequently, should the supply voltage subsequently exceed the back EMF, the phase current continues to be clamped at zero. A further difference between the two sequences is that, when the switches of the first sequence are in the diode state, the self-induced voltage across the phase winding is opposed only by the back EMF. By contrast, when the switches of the second sequence are in the diode state, the self-induced voltage across the phase winding is opposed by both the back EMF and the supply voltage. As a result, the phase current decreases at a faster rate, and the controller has a longer period of time in which to turn all switches OFF before the next event.

The two sequences described above are not mutually exclusive and the controller may employ one or both of the sequences when controlling the excitation of the phase winding.

Change in Polarity of Supply Voltage

Two configuration sequences have been described that better control the phase current around zero-crossings in the supply voltage. In particular, both sequences prevent the reversal in the polarity of the phase current that might otherwise occur when the back EMF exceeds the supply voltage. As will now be explained, both configuration sequences also prevent the reversal of the phase current in the event that the supply voltage changes polarity during excitation.

Figure 8:
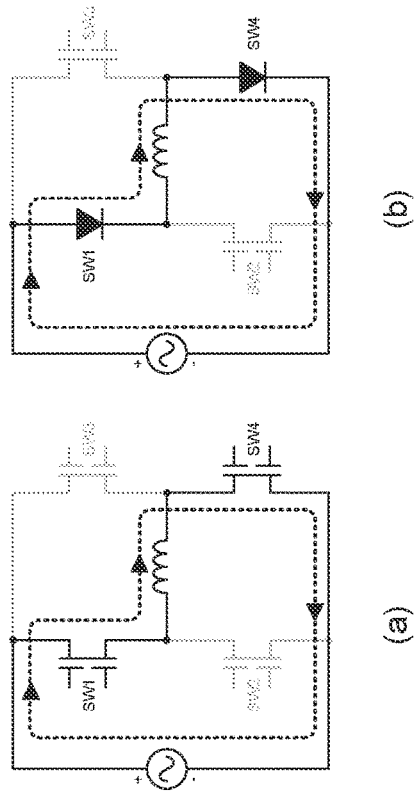
FIG. 8 is a fifth example of a configuration sequence of the converter.
Figure 12:
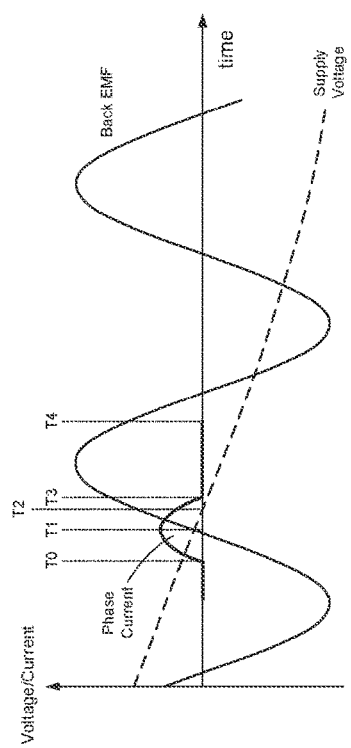
FIG. 12 illustrates example waveforms for supply voltage, back EMF and phase current when employing the configuration sequence of FIG. 8 or FIG. 11.

Let us consider the first of the two configuration sequences described above, i.e. that illustrated in FIG. 8. FIG. 12 illustrates an example of a scenario in which the polarity of the supply voltage changes during excitation.

At T0 the controller configures the converter in the first configuration (e.g. SW1/SW4 are ON, SW2/SW3 are OFF). The phase winding is therefore excited and phase current rises. At T1 the magnitude of the back EMF is the same as that of the supply voltage and therefore the rate of change in the phase current is zero. Between T1 and T2, the magnitude of the back EMF is greater than the supply voltage and therefore the magnitude of the phase current falls. In this particular example, the controller configures the converter in the second configuration when the rate of change in the magnitude of the phase current is less than zero. Consequently, the controller configures the converter in the second configuration (e.g. SW/SW4 are D1, SW2/SW3 are OFF) shortly after T1. At T2 the polarity of the supply voltage changes. The supply voltage therefore opposes, together with the back EMF, the self-induced voltage across the phase winding. At T3 the phase current has fallen to zero. Those switches in a diode state are now reverse biased by the back EMF and the supply voltage. As a result, the phase current is clamped at zero, in spite of the change in the polarity of the supply voltage. The controller then configures the converter in the third configuration (i.e. SW1-SW4 are OFF) at some time after T3.

Let us now consider the second configuration sequence, i.e. that illustrated in FIG. 11. As will become apparent, the situation is little different to that described above for the first configuration sequence. Again, reference will be made to FIG. 12.

At T0 the controller configures the converter in the first configuration (e.g. SW1/SW4 are ON, SW2/SW3 are OFF). The phase winding is therefore excited and phase current rises. At T1 the magnitude of the back EMF is the same as that of the supply voltage and therefore the rate of change in the phase current is zero. Between T1 and T2, the magnitude of the back EMF is greater than the supply voltage and therefore the magnitude of the phase current falls. The controller configures the converter in the third configuration when the rate of change in the magnitude of the phase current is less than zero. Consequently, the controller configures the converter in the second configuration (e.g. SW1/SW4 are ON, SW2/SW3 are D2) followed immediately thereafter by the third configuration (e.g. SW1/SW4 are OFF, SW2/SW3 are D2) shortly after T1. The supply voltage now acts in opposition, along with the back EMF, to the self-induced voltage across the phase winding. However, At T2 the polarity of the supply voltage changes. The supply voltage now acts in the same direction as the self-induced voltage. However, the magnitude of the back EMF is significantly larger than the supply voltage and thus the phase current continues to fall. At T3, the phase current reaches zero. Those switches in a diode state are now reverse biased by the back EMF. The phase current is therefore clamped at zero. The controller then configures the converter in the further configuration (i.e. SW1-SW4 are OFF) at some time after T3.

Conceivably, a situation might arise in which the supply voltage, having changed polarity, might exceed the back EMF whilst the switches are still in the diode state. Whilst this is unlikely to occur in the situation illustrated in FIG. 12, it could conceivably occur at lower speeds where the magnitude of the back EMF is smaller. In this situation, the switches would be forward biased by the supply voltage and the phase current would again rise. However, the polarity of the phase current is unchanged. The situation in somewhat analogous to that of FIG. 10.

Incorrect Timing

The phase winding 21 may be excited inadvertently at the wrong time. By way of example, noise in the position signal, POS, may cause the controller 38 to excite the phase winding 21 at the wrong time. Incorrect timing of excitation may cause phase current to flow in the opposite direction to that desired.

Figures 13, 14:
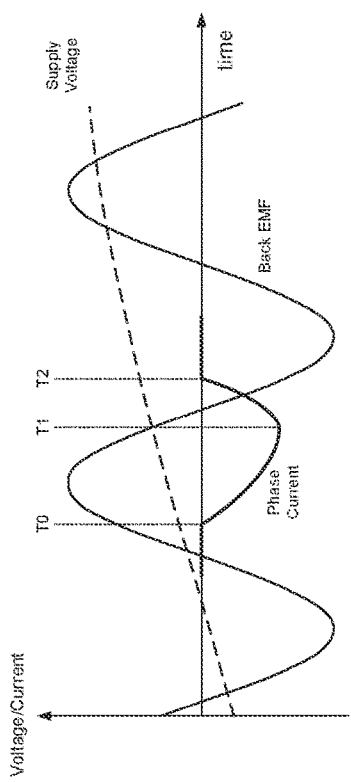
FIG. 13 illustrates example waveforms for supply voltage, back EMF and phase current resulting from incorrect timing of phase excitation of the motor system.
FIG. 14 details four permutations for a particular configuration of the converter, the permutations depending on the polarities of the supply voltage and phase current.

FIG. 13 illustrates an example in which the timing of excitation is incorrect. At T0 the phase winding is excited by turning on switches SW1 and SW4. TO should occur just before the zero-crossing in the back EMF. However, for whatever reason, TO instead occurs just after the zero-crossing in the back EMF. As a result, the phase winding is excited at a time when the back EMF opposes the supply voltage. Moreover, the magnitude of the back EMF is greater than that of the supply voltage at TO. Consequently, when the phase winding is excited (i.e. when switches SW1/SW4 are turned ON), phase current is driven in the opposite direction to that desired by the back EMF. Accordingly, in the example of FIG. 13, the phase current is negative rather than positive, as desired.

Upon sensing that the polarity of the phase current is opposite to that expected, the controller 38 may configure the converter 33 such that the switches that were ON are now placed into a diode state. The choice of diode state (i.e. D1 or D2) is such that a path continues to be provided for the phase current to flow from the phase winding 21 to the capacitor C1. So in the example of FIG. 13, the controller may configure switches SW1 and SW4 into D1 (i.e. downward conducting) shortly after TO.

Between TO and T1, the magnitude of the back EMF increases, peaks, and then decreases. The back EMF is nevertheless greater than the supply voltage throughout the period T0 to T1. As a result, the magnitude of the phase current increases, albeit with negative polarity, over the period T0 to T1. At T1, the magnitude of the back EMF and the supply voltage are the same and thus the rate of change in the phase current is zero. Between T1 and T2, the magnitude of the supply voltage is greater than the back EMF. Additionally, the back EMF transitions through zero and boosts the supply voltage. Accordingly, the magnitude of the phase current decreases over the period T1 to T2. At T2 the phase current is zero and is then clamped by the switches. The controller 38 then configures the converter 33 shortly after T2 such that all switches are turned OFF.

Although the controller 38 may employ the above configuration sequence to manage phase current having the wrong polarity, the situation may be avoided altogether. In each of the examples described above, in which the phase winding is excited, the sequence begins with a configuration in which the high-side switch of a first leg and the low-side switch of a second leg are ON, and the low-side switch of the first leg and the high-side switch of the second leg are OFF. However, the sequence may instead begin with a configuration in which the high-side switch of the first leg and the low-side switch of the second leg are D1 or D2, and the low-side switch of the first leg and the high-side switch of the second leg are OFF. The choice of D1 or D2 is such that switches are forward biased by the supply voltage. As a result of the switches starting in a diode state rather than an ON state, phase current is prevented from flowing in the wrong direction. The controller may then monitor the phase current, i.e. via the current sense signals. In the event that the phase current rises, the controller may revert to one of the configuration sequences described above. In particular, the controller may configure the converter in the first configuration of the above-described sequences in which the high-side switch of the first leg and the low-side switch of the second leg are ON, and the low-side switch of the first leg and the high-side switch of the second leg are OFF. Alternatively, if the phase current does not rise, the controller may configure the converter such that all switches are turned OFF in readiness for the next event.

With this particular configuration sequence, switches are first put into a diode state before being turned ON. As a result, this particular sequence cannot be used when phase current is already flowing through the converter in an opposite direction (i.e. in a direction that opposes the direction of excitation). As noted above, at or around zero-crossings in the supply voltage, the phase current may be clamped to zero after each period of excitation. Accordingly, this configuration sequence may be used in conjunction with either of the two sequences described above in connection with reactive current.

Shutdown

There may be a requirement to shutdown the motor system at any point. Shutdown may occur as part of the normal operation or it may occur in response to a fault condition. If the switches of the converter included body or antiparallel diodes, shutdown might simply involve turning all switches OFF. A path would then be provided by the diodes for transferring inductive energy stored in the motor to the capacitor of the input filter. With the present motor system 10, the switches SW1-SW4 do not have such diodes and therefore the converter 33 must be configured in such a way as to deal with the inductive energy of the motor 20 before the switches SW1-SW4 can be turned OFF.

In response to a shutdown, the controller 38 configures the converter 33 in a first configuration in which a high-side of a first leg and a low-side switch of a second leg are D1 or D2, and the low-side switch of the first leg and the high-side switch of the second leg are OFF. The choice of switches (i.e. SW1/SW4 or SW2/SW3) to put into a diode state depends on the polarity of the supply voltage and the polarity of the phase current, and is chosen such that inductive energy stored in the motor 20 is transferred to the capacitor C1. The choice of diode state (i.e. D1 or D2) depends on the polarity of the supply voltage and is chosen such that the switches are reverse biased by the supply voltage. Accordingly, if the polarity of the supply voltage is positive, the switches are turned to D2 (i.e. upward conducting). Conversely, if the polarity of the supply voltage is negative, the switches are turned to D1 (i.e. downward conducting). There are therefore four possible permutations for the first configuration as detailed in FIG. 14.

Depending on the configuration of the converter 33 immediately prior to shutdown, the controller 38 may configure the converter 33 in one or more pre-configurations prior to the first configuration, so that the converter 33 transitions safely to the first configuration. For example, if switches SW1,SW4 were ON at the point of shutdown, the controller might configure the converter in a pre-configuration in which switches SW1,SW4 are ON and switches SW2,SW3 are in a diode state. The controller 38 would then configure the converter 33 in the first configuration in which, in this instance, switches SW2,SW3 are in the diode state and switches SW1,SW4 are OFF.

When in the first configuration, inductive energy stored in the motor 20 is transferred to the capacitor C1 and the magnitude of the phase current decreases. Upon decreasing to zero, the current is clamped by the switches and the controller 38 configures the converter 33 into a configuration in which all switches are OFF.

As noted, the particular choice of switches and diode state in the first configuration depends on the polarity of the supply voltage. In particular, the switches and the diode state are chosen such that the supply voltage acts in opposition to the self-induced voltage across the phase winding. However, the polarity of the supply voltage may change whilst the converter 33 is in the first configuration. In this instance, the controller 38 reconfigures the converter 33 such that supply voltage continues to act in opposition to self-induced voltage.

In reconfiguring the converter, the controller 38 configures the converter 33 in a second configuration in which the high-side switch of the first leg and the low-side switch of the second leg are one of D1 and D2, and the low-side switch of the first leg and the high-side switch of the second leg are the other of D1 and D2. The only change that has occurred over the first configuration is that the two switches that were previously OFF are now in a diode state. Moreover, the two switches have an opposite diode state to that of the other two switches. So, for example, if switches SW1 and SW4 are D1 then switches SW2 and SW3 are D2, and vice versa. The converter 33 therefore has a configuration in which all switches SW1-SW4 are in a diode state.

The controller 38 then configures the converter 33 in a third configuration in which the high-side switch of the first leg and the low-side switch of the second leg are OFF, and the low-side switch of the first leg and the high-side switch of the second leg are D1 or D2. The only change that has occurred over the second configuration is that the two switches that were previously in a diode state in the first configuration are now OFF. Inductive energy stored in the motor 20 continues to be transferred to the capacitor C1 and thus the magnitude of the phase current decreases. Upon decreasing to zero, the current is clamped by the switches and the controller 38 configures the converter 33 into a final configuration in which all switches are OFF.

Figure 15:
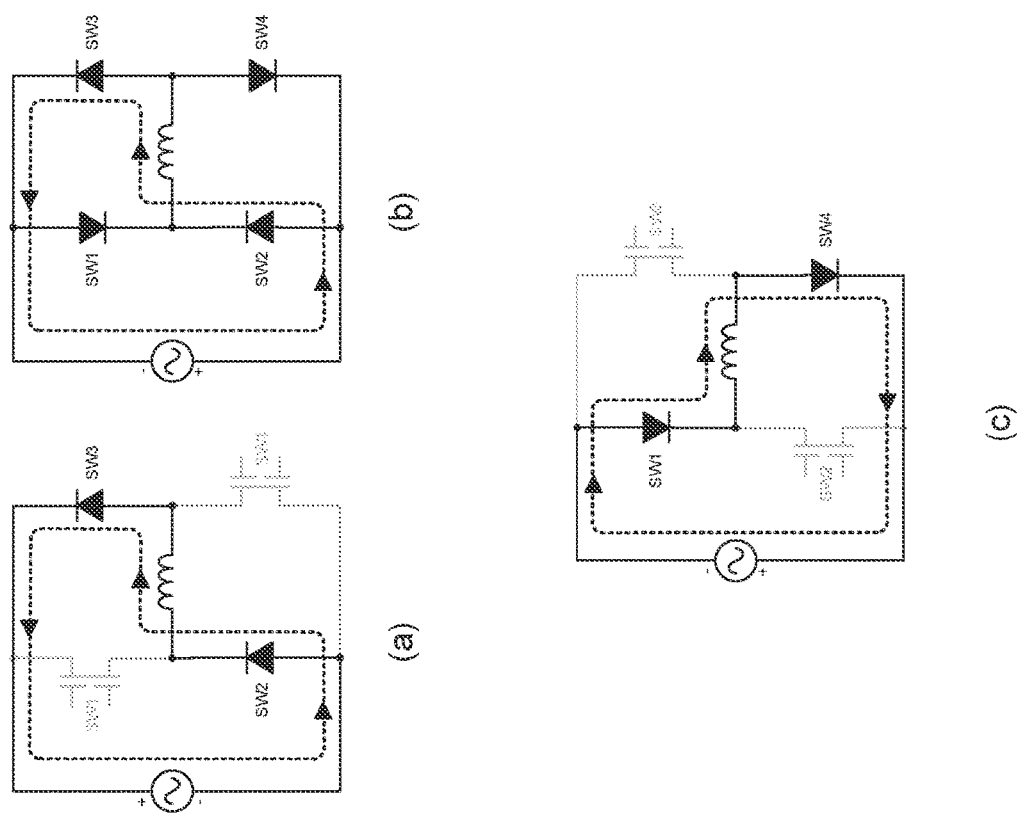
FIG. 15 is a seventh example of a configuration sequence of the converter.

FIG. 15 illustrates an example sequence during shutdown. FIG. 15(a) illustrates the converter in the first configuration. In this particular example, the polarity of the phase current is positive (i.e. current flows in direction from left to right) and the polarity of the supply voltage is positive. Accordingly, switches SW2,SW3 are in diode state D2 and switches SW1,SW4 are OFF. Switches SW2,SW3 are forward biased by the self-induced voltage across the phase winding and therefore phase current continues to flow in a direction from left to right, with the inductive energy stored in the motor being transferred to the capacitor. FIG. 15(b) illustrates the converter in the second configuration. Switches SW1 and SW4, which were previously OFF, are now in diode state D1. As noted, the converter is configured in the second configuration in response to a change in the polarity of the supply voltage. So in this particular example, the polarity of the supply voltage is now negative. As a result, switches SW2 and SW3 are now forward biased by the supply voltage, and switches SW1 and SW4 are reverse biased. FIG. 15(c) illustrates the converter in the third configuration, in which switches SW2,SW3 are OFF. Switches SW1 and SW4 are then forward biased by the self-induced voltage across the phase winding. Phase current therefore continues to flow in a direction from left to right, with the inductive energy stored in the motor being transferred to the capacitor. Finally, although not illustrated, when the phase current falls to zero, the converter is configured into a final configuration in which all switches SW1-SW4 are OFF.

Gate Driver

As noted above, it may be necessary to shutdown the motor system 10 in the event of a fault. Whilst the controller 38 is normally expected to control the shutdown sequence, the fault may reside within the controller 38. The gate driver 37 is therefore also configured to shutdown the motor system 10 in the event of a fault. The fault may arise as a result of absent or conflicting control signals from the controller, or as a result of overcurrent across one or more of the switches.

The gate driver 37 receives the signals V_POL and I_POL, which respectively provide an indication of the polarity of the supply voltage and the phase current. In the event of a fault, the gate driver uses these signals to shutdown the motor system 10 using the same sequence as that described above, i.e. the gate driver 37 generates a sequence of gate signals that depends on the polarity of the voltage and the polarity of the current.

As illustrated in FIG. 14, there are four possible permutations for the first configuration of the sequence. Accordingly, in response to a fault, the gate driver generates gate signals for: (i) driving a first pair of switches to D1 and a second pair of switches to OFF when the polarity of the voltage is positive and the polarity of the current is positive, (ii) driving the first pair of switches to D2 and the second pair of switches to OFF when the polarity of the voltage is negative and the polarity of the current is positive, (iii) driving the first pair of switches to OFF and the second pair of switches to D1 when the polarity of the voltage is positive and the polarity of the current is negative, and (iv) driving the first pair of switches to OFF and the second pair of switches to D2 when the polarity of the voltage is negative and the polarity of the current is negative.

Although not illustrated in FIG. 2, the gate driver 37 also receives an input signal that provides a measure of the magnitude of the phase current. The input signal may be analogue or digital. For example, the gate driver may receive the current sense signals, I_SENSE1 and I_SENSE2. Alternatively, the input signal may be a digital signal that is logically high when the phase current is non-zero, and logically low when the phase current is zero. The gate driver uses the input signal to drive all switches OFF when the magnitude of the phase current is zero.

If there is a change in the polarity of the supply voltage whilst in the first configuration, the gate driver 37 configures the converter 33 in the second configuration followed by the third configuration. In the second configuration, the gate driver 37 generates gate signals for driving a first pair of switches to D1 and a second pair of switches to D2. More particularly, the gate driver 37 generates gate signals for: (i) driving a first pair of switches to D1 and a second pair of switches to D2 when the polarity of the current is positive, and (ii) driving the first pair of switches to D2 and the second pair of switches to D1 when the polarity of the current is negative.

When in the third configuration, the gate driver 37 employs the same logic as that in the first configuration. The polarity of the supply voltage has changed and therefore a different pair of switches are in a different diode state, but the logic in deciding which switches and which diode state (i.e. D1 or D2) is unchanged. Accordingly, the gate driver generates gate signals for: (i) driving a first pair of switches to D1 and a second pair of switches to OFF when the polarity of the voltage is positive and the polarity of the current is positive, (ii) driving the first pair of switches to D2 and the second pair of switches to OFF when the polarity of the voltage is negative and the polarity of the current is positive, (iii) driving the first pair of switches to OFF and the second pair of switches to D1 when the polarity of the voltage is positive and the polarity of the current is negative, and (iv) driving the first pair of switches to OFF and the second pair of switches to D2 when the polarity of the voltage is negative and the polarity of the current is negative.

Whilst it is not unknown for a gate driver to include fault protection logic, it is both unknown and unusual for a gate driver to monitor the polarity of a voltage and/or the polarity of a current and to then generate gate signals in response. Although the gate driver described here uses both the polarity of the supply voltage and the polarity of the phase current to generate gate signals, there may be instances for which gate driver may use just the polarity of the supply voltage or the polarity of the phase current.

With the drive circuit described herein, a motor may be driven using an AC supply voltage without the need for a rectifier or PFC stage. This is made possible by the provision of a converter having bidirectional switches. In particular, the switches can be controlled such that, irrespective of the polarity of the supply voltage, a voltage of either polarity may be applied to the phase winding. The provision of bidirectional switches is not, however, without its difficulties. In particular, the absence of antiparallel diodes presents challenges when managing the inductive energy stored in the motor as well as any energy that may be generated by the motor. The controller therefore configures the converter in different configuration sequences in order to ensure that the motor system safely transitions from one operating state to the next. Whilst various configuration sequences have been described, it is not essential that the controller employ each and every configuration sequence.

The invention claimed is:

1. A drive circuit for a brushless motor, the drive circuit comprising:

a converter for connection to a phase winding of the motor, the converter comprising a plurality of switches; and a controller for controlling the switches to configure the converter in a plurality of configurations comprising:

a first configuration in which the converter is controlled to permit current flow through the phase winding in a first direction and in a second opposite direction; and a second configuration in which the converter is controlled to permit current flow through the phase winding in the first direction and is prevented from flowing through the phase winding in the second direction, wherein the controller comprises an input for receiving a signal indicative of current in the converter, and the controller configures the converter from the first configuration to the second configuration in response to a characteristic of the current; and wherein each of the switches has four states: (i) ON in which the switch is conductive in both a first direction and a second direction, (ii) D1 in which the switch is conductive in the first direction and non-conductive in the second direction, (iii) D2 in which the switch is non-conductive in the first direction and conductive in the second direction, and (iv) OFF in which the switch is non-conductive in both the first direction and the second direction;

in the first configuration, the states of a pair of switches are controlled to the ON state and the states of another pair of switches are controlled to the OFF state; and in the second configuration, the states of a pair of switches are controlled to one of the D1 and D2 states, and the states of another pair of switches are controlled to the OFF state.

2. The drive circuit as claimed in claim 1, wherein the controller configures the converter from the first configuration to the second configuration upon detecting that a magnitude or a rate of change of the current is less than a threshold.

3. The drive circuit as claimed in claim 1, wherein: the plurality of configurations comprises a third configuration in which current is prevented from flowing through the phase winding in the first direction and the second direction; and the controller configures the converter from the second configuration to the third configuration.

4. The drive circuit as claimed in claim 3, wherein the controller configures the converter from the second configuration to the third configuration upon detecting that a magnitude of the current is zero.

5. The drive circuit as claimed in claim 1, wherein the controller comprises an input for receiving a signal indicative of a polarity of a voltage, and the controller configures the converter in the second configuration such that the states of switches are controlled to one of D1 and D2 according to the polarity of the voltage.

6. The system of claim 5, wherein the converter comprises a plurality of legs, each leg comprises a high-side switch and a low-side switch, and each pair of switches in the first configuration and in the second configuration comprises a high-side switch of one leg and a low-side switch of another leg.

7. The drive circuit as claimed in claim 1, wherein:

in the first configuration, the states of a first pair of switches are controlled to the ON state and the states of a second pair of switches are controlled to the OFF state; and in the second configuration, the states of the first pair of switches are controlled to one of the D1 and D2 and the states of the second pair of switches are controlled to the OFF state.

8. The drive circuit as claimed in claim 1, wherein:
in the first configuration, the states of a first pair of switches are controlled to the ON state and the states of a second pair of switches are controlled to the OFF state;
in the second configuration, the states of the first pair of switches are controlled to the OFF state and the states of the second pair of switches are controlled to one of D1 and D2;
the plurality of configurations comprises an intermediate configuration in which the states of the first pair of switches are controlled to the ON state and the states of the second pair of switches are controlled to one of D1 and D2; and
the controller, in configuring the converter from the first configuration to the second configuration, configures the converter from the first configuration to the intermediate configuration, and from the intermediate configuration to the second configuration.

9. The drive circuit as claimed in claim 1, wherein the controller configures the converter to switch from the first configuration to the second configuration upon detecting that a rate of change of the current is less than a threshold.

10. The drive circuit as claimed in claim 1, wherein the controller is configured to monitor current in the converter and, during motor operation, to actively reconfigure the converter from the first configuration to the second configuration in response to detecting that the rate of change of the current is less than zero.

11. A drive circuit for a brushless motor, the drive circuit comprising:
a converter for connection to a phase winding of the motor, wherein the converter comprises a plurality of legs, each leg comprises a high-side switch and a low-side switch, and each switch comprises four states corresponding to: (i) ON in which the switch is conductive in both a first direction and a second direction, (ii) D1 in which the switch is conductive in the first direction and non-conductive in the second direction, (iii) D2 in which the switch is non-conductive in the first direction and conductive in the second direction, and (iv) OFF in which the switch is non-conductive in both the first direction and the second direction; and
a controller for controlling the states of the switches to configure the converter in a plurality of configurations comprising:
a first configuration in which the high-side switch of a first leg and the low-side switch of a second leg are configured to the ON state, and the low-side switch of the first leg and the high-side switch of the second leg are configured to the OFF state; and
a second configuration in which (i) the high-side switch of the first leg and the low-side switch of the second leg are configured to one of D1 and D2, and the the low-side switch of the first leg and the high-side switch of the second leg are configured to the OFF state, or (ii) the high-side switch of the first leg and the low-side switch of the second leg are configured to the OFF state, and the low-side switch of the first leg and the high-side switch of the second leg are configured to the other of D1 and D2,
wherein the controller configures the converter to the first configuration and subsequently configures the converter from the first configuration to the second configuration.

12. The drive circuit as claimed in claim 11, wherein the controller comprises an input for receiving a signal indicative of a polarity of a voltage, and the controller configures the converter in the second configuration such that the states of switches are one of D1 and D2 according to the polarity of the voltage.

13. The drive circuit as claimed in claim 11, wherein the controller comprises an input for receiving a signal indicative of current in the converter, and the controller configures the converter to switch from the first configuration to the second configuration in response to a characteristic of the current.

14. The drive circuit as claimed in claim 13, wherein the controller configures the converter from the first configuration to the second configuration when a magnitude or a rate of change of the current is less than a threshold.

15. The drive circuit as claimed in claim 13, wherein the controller configures the converter to switch from the first configuration to the second configuration upon detecting that a rate of change of the current is less than a threshold.

16. The drive circuit as claimed in claim 13, wherein the controller is configured to monitor current in the converter and, during motor operation, to actively reconfigure the converter from the first configuration to the second configuration in response to detecting that the rate of change of the current is less than zero.

17. The drive circuit as claimed in claim 11, wherein:
in the second configuration, the high-side switch of the first leg and the low-side switch of the second leg are controlled to the OFF state, and the low-side switch of the first leg and the high-side switch of the second leg are controlled to the other of D1 and D2;
the plurality of configurations comprises an intermediate configuration in which the the high-side switch of the first leg and the low-side switch of the second leg are controlled to the ON state, and the low-side switch of the first leg and the high-side switch of the second leg are controlled to the other of D1 and D2; and
the controller, in configuring the converter from the first configuration to the second configuration, configures the converter from the first configuration to the intermediate configuration, and from the intermediate configuration to the second configuration.

18. The drive circuit as claimed in claim 11, wherein:
the plurality of configurations comprises a third configuration in which the states of the high-side switches and the low-side switches of the first and second legs are OFF; and
the controller configures the converter from the second configuration to the third configuration.

19. The drive circuit as claimed in claim 18, wherein the controller comprises an input for receiving a signal indicative of current in the converter, and the controller configures the converter from the second configuration to the third configuration upon detecting that a magnitude of the current is zero.

* * * * *